United States Patent [19]

Van Dijk et al.

[11] Patent Number: 5,665,858
[45] Date of Patent: Sep. 9, 1997

[54] PROCESS FOR COAGULATION FINISHING OF POLYMERS

[75] Inventors: Cornelis Martinus Van Dijk; Paulus Alexander Maria Grotenhuis, both of Amsterdam, Netherlands

[73] Assignee: Shell Oil Company, Houston, Tex.

[21] Appl. No.: 564,686

[22] Filed: Nov. 29, 1995

[30] Foreign Application Priority Data

Nov. 29, 1994 [EP] European Pat. Off. ............. 94308787

[51] Int. Cl.$^6$ ....................................................... C08F 6/12
[52] U.S. Cl. .............................................. 528/495; 528/500
[58] Field of Search ....................................... 528/495, 500

[56] References Cited

U.S. PATENT DOCUMENTS 4,154,923  5/1979  Braun ................................. 528/485

Primary Examiner—Thomas R. Weber
Attorney, Agent, or Firm—Donald F. Haas

[57] ABSTRACT

A process for coagulation finishing (co)polymer by using polyvinyl alcohol as dispersant during said coagulation. In particular, low viscosity block copolymers, comprising at least one block of predominantly conjugated diene and at least one block of predominantly monovinyl aromatic monomer, can be successfully finished. The polyvinylalcohol is characterized by a weight average molecular weight of from 200 to 200,000 and by an average degree of hydrolysis of from 25 to 98%.

11 Claims, No Drawings

PROCESS FOR COAGULATION FINISHING OF POLYMERS

FIELD OF THE INVENTION

The invention relates to a process for coagulation finishing of polymers. More in particular the invention relates to an improvement of the steam coagulation process, finishing block and random copolymers derived from predominantly conjugated diene and/or predominantly monovinyl aromatic.

BACKGROUND OF THE INVENTION

The use of steam coagulation processes for finishing random and block copolymers is described in European patent application no. 0413403. Said European patent application, and in particular page 6, lines 7, 8, and lines 54–56, teaches treating a cement of random copolymers or block copolymers from monovinyl aromatic and conjugated diene and a solvent, comprising for a significant part cyclopentane, after termination of the organo alkali metal initiated anionic polymerization reaction of predominantly monovinyl aromatic and predominantly conjugated diene by means of either a proton donating agent in the case of a fully sequentially prepared block copolymer or a coupling agent in the case of an initially prepared intermediate diblock copolymer, by means of steam coagulation.

However, a generally appreciated shortcoming of such a process, in particular when applied on block copolymers derived from monovinyl aromatic hydrocarbons and conjugated dienes and having a relative low viscosity, was the formation of large agglomerates and severe rector fouling and/or the finishing of said block copolymers proceeding in very low throughputs, and therefore additional recovery costs. On the other hand, it was generally known to the average person skilled in the art that alternative finishing methods involved with much higher capital investments due to additional expensive equipment.

The need for block copolymers derived from predominantly monovinyl aromatic and predominantly conjugated diene having a relatively low viscosity, for several modern block copolymer end use applications, e.g. pressure sensitive adhesives, was still growing. On the other hand, the economy of block copolymer finishing was demanding lower costs, i.e. higher throughputs, reduced clean out time due to avoid or diminish fouling, and lower capex.

An object of the present invention was therefore to provide an improved process for the coagulation finishing of (co)polymers, and in particular those derived from predominantly conjugated diene and/or predominantly monovinyl aromatic hydrocarbons.

It will be appreciated that with the term "process for coagulation finishing of (co) polymers," as used throughout the present specification, is meant to cover in principal all finishing processes wherein a (co)polymer containing organic solvent solution is mixed with an immiscible liquid, wherein the polymer is substantially not soluble, under simultaneous supply of heat to devolatilize a substantial part of the organic solvent by means of a hot fluid, such as steam or a hot inert gas e.g. nitrogen. Of these embodiments the steam coagulation finishing process is the most preferred. As a result of extensive research and experimentation such an improved process aimed at has surprisingly been found.

SUMMARY OF THE INVENTION

Accordingly, the present invention relates to a process for coagulation finishing of (co)polymers, and in particular those derived from predominantly conjugated diene and/or predominantly monovinyl aromatic, by coagulation of a (co)polymer containing cement in the presence of polyvinyl alcohol as dispersant. Preferably, the present invention relates to a process for steam coagulation finishing of block copolymers comprising at least one block derived of predominantly conjugated diene and at least one block derived of predominantly monovinyl aromatic hydrocarbon.

The polyvinyl alcohol to be used for the process of the present invention has a weight average molecular weight in the range of from 200 to 200,000, and preferably from 3000 to 30,000, and may have an average degree of hydrolysis in the range of from 25 to 98%, and preferably from 60 to 90%. The polyvinyl alcohol is added in amounts of from 10 to 10,000 ppm relative to the weight of the coagulation water, preferably from 25 to 1000 ppm, and most preferably from 40 to 100 ppm. According to a preferred embodiment of the present process the polyvinylalcohol is introduced into the contactor by means of a small water stream, but it will be appreciated that according to other embodiments the PVA can be introduced into the contactor via the premixed cement.

DETAILED DESCRIPTION OF THE INVENTION

It has surprisingly been found that the use of polyvinylalcohol as dispersant during a coagulation finishing process, and in particular a steam coagulation finishing process for block copolymers containing at least one block of predominantly conjugated diene and at least one block of predominantly monovinyl aromatic, could prevent the formation of large agglomerates and severe reactor fouling for low viscosity block copolymer grades. The block copolymer concentration in the slurry could be increased significantly, e.g., from 1 wt % to 4.5 wt %, when 50 ppm of polyvinyl alcohol is used in the coagulation water. The use of polyvinyl alcohol dispersant will allow higher throughputs due to increased block copolymer concentrations in the slurry and reduced clean out time due to reactor fouling.

The term "predominantly" as used throughout the specification means that the specified monomer can be used in substantially pure form or can be intentionally mixed with certain specific minor amounts of comonomer (<20 wt %) which may be structurally similar to or structurally different from the major monomer constituent of a block segment. For example, the main constituent 1,3-butadiene may be mixed with minor amounts of other conjugated dienes, such as isoprene, 1,3-pentadiene, 2,3-dimethyl-1,3-butadiene, 2-methyl-1,3-pentadiene or 2,3-dimethyl-1,3-pentadiene or mixtures thereof, or with structurally different comonomers, such as monovinyl aromatic hydrocarbons. The monovinyl aromatic monomer main component usually will be selected from styrene, optionally mixed with minor amounts of α-methylstyrene; 3,5-diethylstyrene, 4-n-propylstyrene, 2,4, 6-trimethylstyrene; 4-phenylstyrene, 4-methyl styrene, 3,5-diphenylstyrene, 1-vinylnaphthalene; 3-ethyl-1-vinylnaphthalene; phenyl-1-vinylnaphthalene or mixtures thereof, or mixed with isoprene; butadiene, 1,3-pentadiene, 2,3-dimethyl-1,3-butadiene, 2-methyl-1,3-pentadiene or 2,3-dimethyl-1,3-pentadiene or mixtures thereof. The copolymer block segment derived from such monomer mixtures may have a substantially random or tapered structure. If copolymer blocks are made, preferably the major monomer constituent of one specific block segment, is mixed with the main monomer component of the other block segment, e.g. butadiene mixed with styrene.

It will be appreciated that the process of the present invention is applied on (co)polymer cements, the polymer in which may preferably consist of a predominantly poly (conjugated diene) or of a copolymer of conjugated diene and monovinyl aromatic hydrocarbon. More preferably, the process is used for finishing of block copolymers which have a bound poly (monovinylaromatic hydrocarbon) content in the range from 15 to 90 wt % and more in particular from 25 to 85 wt %.

Another category of block copolymer which can be preferentially finished by the process of the present invention is low viscosity block copolymers for use in adhesive compositions. Said block copolymers comprise in particular block copolymers of the type ABA $(AB^1)_nX$, wherein component A represents a predominantly polystyrene block having an average molecular weight ranging from 5000 to 30,000, wherein B represents a predominantly poly (isoprene) and/or poly(butadiene) block, which optionally may have been selectively hydrogenated, and having an average molecular weight ranging from 30,000 to 70,000, wherein $B^1$ represents a predominantly poly(isoprene) block segment having an average molecular weight ranging from 15,000 to 35,000, wherein X is the residue of a non-halogen-containing coupling agent and n is greater than 3, the overall molecular weight whereof ranges from 50,000 to 300,000, and wherein the contents of bound styrene in the block copolymer is in the range of from 10 to 50 wt % relative to the weight of the complete block copolymer. More in particular, the average molecular weight of the B block of said specific ABA triblock copolymers will range from 30,000 to 50,000, while the A block's average molecular weight will range from 8000 to 25,000, the overall molecular weight of the copolymer ranges from 50,000 to 200,000, and the A component is present in an amount ranging from 10 to 30 wt %.

It will be appreciated that a triblock copolymer ABA or a radial block copolymer $(AB^1)_nX$ main product may be accompanied by a varying amount of diblock copolymer $AB^1$, which is the inevitable result of coupling of precedingly prepared living block copolymers $AB^1$ with a coupling agent into $(AB^1)_n X$ or ABA, due to a coupling efficiency of <95%, or which has intentionally been coproduced with or added to a fully sequential polymerized triblock copolymer in order to have adapted the processability on behalf of the manufacture of hot melt adhesive compositions. Said present diblock copolymers may have an average molecular weight from 40,000 to 80,000.

The process of the present invention has been found to be successfully applied on (co)polymer cements comprising a large variety of inert organic solvents, in which the preceding polymerization took place. More particularly, the process has been found to be successfully applied on cements comprising block copolymers containing pure blocks of styrene and blocks of butadiene and/or isoprene. The solvents may usually be selected from cyclohexane or cyclopentane, optionally mixed with minor amounts (<50 vol %) of solvents selected from linear or branched alkanes, having from 5 to 7 carbon atoms, such as n-hexane, isopentane, or n-pentane.

The process of the present invention is normally applied by mixing the cement with steam of a pressure in the range of from 3 to 12 bara and a temperature in the range of from 120° to 200° C. in a contactor and the mixture is introduced into a coagulator which is usually operated at a temperature in the range from 90° to 120° C. and at a pressure from 1.0 to 2.5 bara. Most of the solvent is flashed off and condensed.

The resulting rubber slurry normally contains from 3 to 5 wt % of polymer and approximately 5 wt % of residual solvent on polymer which is further removed in one or more steam flashing steps, operating at a temperature from 95° to 105° C. and from 1 to 1.5 bara, until a solvent content of 0.2 wt % or lower is achieved. Normally the residence time in each steam flashing vessel is in the range of from 20 to 40 minutes.

It is true that a process of dewatering an aqueous slurry of polymer beads, and in particular polyester beads, which slurry contained poly vinyl alcohol dispersion stabilizer, was known from U.S. Pat. No. 4,154,923. This process comprises the steps:

(a) precipitation in the slurry of an insoluble organic destabilizer, having a molecular weight of at least 200, from a soluble parent compound containing solubilizing ionizable groups, in a sufficient quantity to flocculate and promote dewatering of the slurry, and (b) dewatering the slurry so treated by physically separating it from water at a temperature of at least 50° C. to form a soft cake of polymer beads essentially free of poly (vinyl alcohol) dispersion stabilizer.

However the use of poly (vinyl alcohol) was only taught to a person skilled in the art to be disadvantageous, as poly (vinyl alcohol) containing polymer slurries to be recovered needed an additional precipitation step with destabilizer to prepare the polymer free of poly (vinyl alcohol). Therefore a person skilled in the art is only lead away from its application for coagulation finishing.

The invention can be further illustrated by the following examples, however without restricting its scope to these embodiments.

EXAMPLE 1

1500 grams of Cariflex® TR-1112 polymer was charged to a 25 liter stainless steel reactor equipped with a stirrer and 14.1 liter (11.0 kg) cyclohexane and 9 liter (5.7 kg) isopentane was added. The reactor was pressurized with 1 barg nitrogen and stirred during 12 hours. The resulting solution was transported to a vessel and stored while stirring under 4 barg nitrogen pressure.

A 100 liter coagulation vessel equipped with a stirrer was charged with 30 liter demineralized water. To this reaction was then added 1.616 gram of polyvinylalcohol having an average molecular weight (Mw) in the range of from 9000 g/mole to 10,000 g/mole and an average degree of hydrolysis of 80% as a solid. The aqueous solution was stirred while heated by high pressure steam and a mixture of high pressure steam and the hydrocarbon thermoplastic elastomer solution were injected into the coagulation vessel at such a rate that a steady stream of distillate, consisting of water and hydrocarbon solvent, was obtained. The content of the coagulation vessel was discharged and collected. The wet polymer was dried using hot air of approximately 45° C. during 8 hours. 1480 grams of fine white crumbs were obtained.

The coagulation of Cariflex® TR-1112 polymer carried out under similar conditions as described above, but without the added polyvinylalcohol, resulted in large agglomerates and severe fouling of the coagulation vessel occurred.

EXAMPLE 2

9 liter (7.0 kg) of an experimental thermoplastic elastomer (10 wt % in cyclohexane, branched SBS, Mw step-I 35,000 g/mole, 70 wt % polystyrene content) was charged to a vessel and 6 liter (3.7 kg) of iso-pentane was added. The resulting solution was stored while stirring under 4 barg nitrogen pressure.

A 100 liter coagulation vessel was charged with 30 liter demineralized water. To this reactor was then added 1.50 grams of polyvinylalcohol having an average molecular weight (M) in the range of 9000 g/mole to 10,000 g/mole and an average degree of hydrolysis of 80% as a solid.

The aqueous solution was stirred while heated by high pressure steam injection to a temperature in the range of 95° to 100° C. in approximately 30 minutes. A mixture of high pressure steam and the hydrocarbon thermoplastic elastomer solution were injected into the coagulation vessel at such a rage that a steady stream of distillate, consisting of water and hydrocarbon solvent was obtained. Simultaneously, an aqueous solution containing 0.7% wt of the above described polyvinylalcohol was added to the high pressure steam/polymer solution mixture with an average rate of 10 ml/min. The content of the coagulation vessel was discharged and collected. The wet polymer was dried using hot air of approximately 45° C. during 8 hours. Approximately 700 grams of white crumbs were obtained.

The coagulation of the same experimental thermoplastic elastomer (10% wt in cyclohexane, branched SBS, Mw step-I 35,000 g/mole, 70% wt polystyrene content) carried out under similar conditions as described above, but without the added polyvinylalcohol, resulted in the formation of very large agglomerates leading to problems in discharging the coagulator and in the drying step.

We claim:

1. In a process for coagulation finishing (co)polymers, characterized in that a (co)polymer is formed by anionically polymerizing at least one anionically polymerizable monomer in a solvent to produce a polymer cement, terminating theanionic polymerization, and mixing the cement with steam, the improvement which comprises carrying out the coagulation of said (co)polymer in the presence of polyvinyl alcohol as dispersant.

2. A process according to claim 1, characterized in that the (co)polymer has been derived from predominantly conjugated dienes and/or predominantly monovinylaromatic hydrocarbons.

3. A process according to claim 1, characterized in that the polyvinyl alcohol has a weight average molecular weight in the range of from 200 to 200,000.

4. A process according to claim 3, characterized in that the polyvinyl alcohol has a weight average molecular weight in the range of from 3000 to 30,000.

5. A process according to claim 4, characterized in that the polyvinyl alcohol has an average degree of hydrolysis in the range of from 25 to 98%.

6. A process according to claim 5, characterized in that the polyvinyl alcohol has an average degree of hydrolysis in the range of from 60 to 90%.

7. A process according to claim 1, characterized in that the polyvinyl alcohol is added in amounts of from 10 to 10,000 ppm relative to the weight of the coagulation water.

8. A process according to claim 7, characterized in that the polyvinyl alcohol is added in amounts of from 25 to 1000 ppm.

9. A process according to claim 8, characterized in that the polyvinyl alcohol is added in amounts of 40 to 100 ppm.

10. A process according to claim 1, characterized in that the polyvinyl alcohol is introduced into the contactor by means of a small water stream.

11. A process according to claim 1, characterized in that the cement is mixed with steam of a pressure in the range of from 3 to 12 bara and a temperature in the range of from 120° to 200° C. in contactor and that the mixture is introduced into a coagulator which is operated at a temperature in the range of from 90° to 120° C. and at a pressure of from 1.0 to 2.5 bara.

* * * * *